Dec. 19, 1950 P. C. WILBUR 2,534,648
METHOD OF AND APPARATUS FOR STEAMING VEGETABLES
Filed June 12, 1945 2 Sheets-Sheet 1

INVENTOR:
PAUL C. WILBUR
BY
ATTORNEY

Dec. 19, 1950 P. C. WILBUR 2,534,648
METHOD OF AND APPARATUS FOR STEAMING VEGETABLES
Filed June 12, 1945 2 Sheets-Sheet 2

INVENTOR:
PAUL C. WILBUR
BY
ATTORNEY

Patented Dec. 19, 1950

2,534,648

UNITED STATES PATENT OFFICE 2,534,648

METHOD OF AND APPARATUS FOR STEAMING VEGETABLES

Paul C. Wilbur, San Jose, Calif., assignor to Food Machinery and Chemical Corporation, a corporation of Delaware Application June 12, 1945, Serial No. 598,938

3 Claims. (Cl. 146—226)

1

This invention relates to the art of commercially peeling vegetables by first subjecting the vegetables to steam under pressure to loosen the skins and then rubbing, brushing or washing the loosened skins from the product.

Prior to the present invention, this mode of peeling vegetables has been practised with considerable loss due to the steaming operation being so conducted as to soften up by cooking the layers just under the skin whereby these surface layers, which are of edible material, come off with the skin in the final skin removing step and are lost.

It is an object of this invention to provide a method of and apparatus for peeling vegetables, in which the skin is loosened by steam and subsequently removed by attrition, and in which a relatively small loss of edible material is suffered in the final step of skin removal.

The steaming step of the general method of peeling vegetables above noted has heretofore been accomplished by placing the vegetables in a retort and, after closing this, introducing steam until the desired pressure is produced for loosening the skins of the vegetables. While the higher steam pressures are much more effective for loosening the skins of vegetables than steam at a pressure close to atmospheric, cooking of the outer edible layers starts to take place when the temperature gets above 148° F. Thus, in the steaming step as commonly practised, the vegetables are subjected to a steam temperature above 200° F. for at least one or more minutes while the steam pressure in the retort is being raised to the point where the skin will be quickly loosened. A half minute or more also elapses after the steam is allowed to exhaust from the retort before the vegetables can be removed from the steam. The vegetables are thus in the steam for such a long period that cooking of the edible layers just under the vegetable skin is unavoidable.

It is an object of my invention to provide a method of and apparatus for peeling vegetables in which the skins are loosened by steam at super-atmospheric pressure, and in which the vegetables are subjected to the steam only under a super-atmospheric pressure suitable for rapidly loosening the skins and for precisely that period necessary to accomplish the loosening of the skins by steam at said pressure, thereby eliminating a large part of the cooking of sub-skin edible layers which is unavoidable in the retort steaming step above noted.

It is another object of my invention to provide such a method of and apparatus for peeling vegetables which is continuous in operation and which

2 not only accomplishes the objects aforesaid but possesses the advantages inherent in any continuous process over a corresponding batch process.

The manner of accomplishing the foregoing objects, as well as further objects and advantages, will be made manifest in the following description taken in connection with the accompanying drawings in which.

Figure 1:
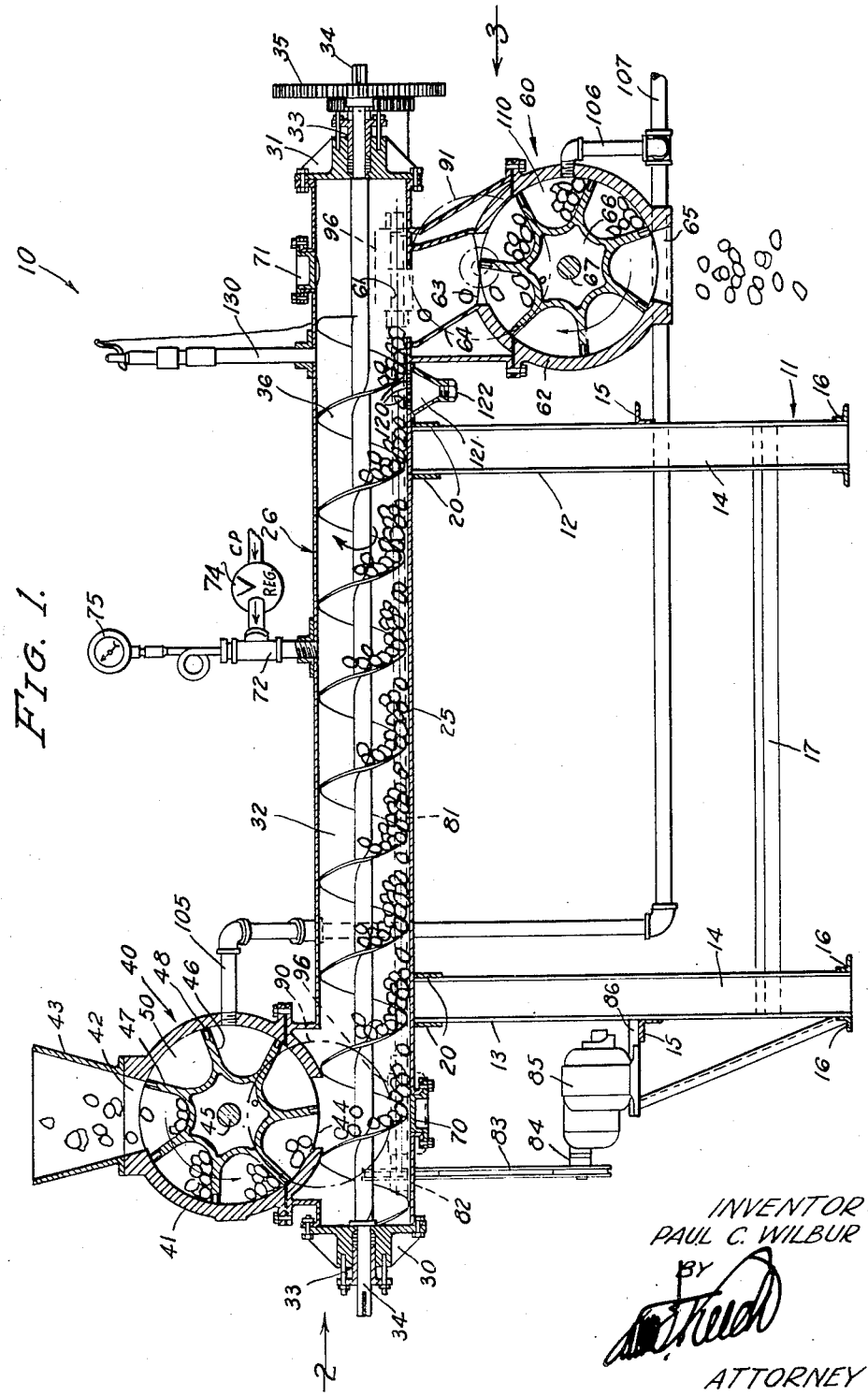
Fig. 1 is a longitudinal vertical sectional view of a preferred form of apparatus for carrying out the method of my invention.

Referring specifically to the drawings, an apparatus 10 disclosed therein is in the nature of a steamer and is adapted exclusively for steaming vegetables. When the apparatus 10 is operated commercially, a suitable elevator is provided for delivering the vegetables to this apparatus and another is provided for taking the steamed vegetables away from it. After the vegetables have been steamed in accordance with the process of my invention to loosen the skins thereof, it is necessary in order to remove the loosened skins to submit the vegetables to a brushing step or to sprays of water which scour the loosened skins from the surfaces of the vegetables.

The apparatus 10 is supported on a frame 11 including a pair of A-frames 12 and 13 having legs 14 connected by cross braces 15 and 16, the A-frames being joined by longitudinal braces 17. At their upper ends, the legs 14 are joined by gusset plates 20 which are shaped to form cradles for supporting a tubular body 25 of the apparatus 10.

The tubular body 25 has heads 30 and 31 closing its opposite ends to form a steam chamber 32. The heads 30 and 31 have bearing stuffing boxes 33 through which opposite ends of a shaft 34 extend. Mounted on one extending end of the shaft 34 is a gear wheel 35. Fixed upon the shaft 34 within the chamber 32 is a screw conveyor 36.

The tubular body 25 has a vegetable introducing valve 40 embodied therewith. This valve includes a cylindrical valve body 41 having a receiving opening 42 with which a hopper 43 communicates, and a delivery opening 44 which communicates downwardly with the chamber 32. Mounted on a shaft 45 which journals in suitable bearings provided upon the valve body 41 is a vegetable feeding valve rotor 46. This rotor has radiating blades 47, outer edges of which are slotted to carry spring urged packing slides 48 which bear against the inner face of the valve body 41 and reduce the opportunity for leakage of steam past the rotor 46 to a bare minimum. The spaces between the adjacent blades 47 of the rotor 46 form a plurality of peripherally inclined vegetable feeding pockets 50.

At its opposite end, the tubular body 25 has mounted thereon a vegetable removing or discharge valve 60 which is identically like the valve 40 and includes a plurality of peripherally disposed pockets 110. Valve 60 is mounted beneath the tubular body 25 to receive vegetables from the chamber 32 through a hole 61 in the body 25. Valve 60 has a cylindrical body 62 with a receiving hole 63 connected by a tubular chute 64 with the opening 61. The valve body 62 also has a discharge mouth 65 and a rotor 66 which is mounted on a shaft 67, the latter journaling in suitable bearings provided on the valve body 62.

Doors 70 and 71 are provided in the tubular body 25 directly opposite the valves 40 and 60 for inspection and repair purposes. Connecting with the tubular body 25 for the introduction of steam into the chamber 32 is a steam pipe 72 having a manual control valve 73, a pressure control valve 74, and a steam gauge 75.

Journaled in suitable bearings 80 provided on the tubular body 25 is a shaft 81 which extends substantially the full length of the apparatus. This shaft has a driven sprocket 82 which is connected by a drive chain 83 to a sprocket 84 provided upon a geared variable speed electric motor 85 which is supported on a platform 86 provided on the frame 11.

Figure 3:
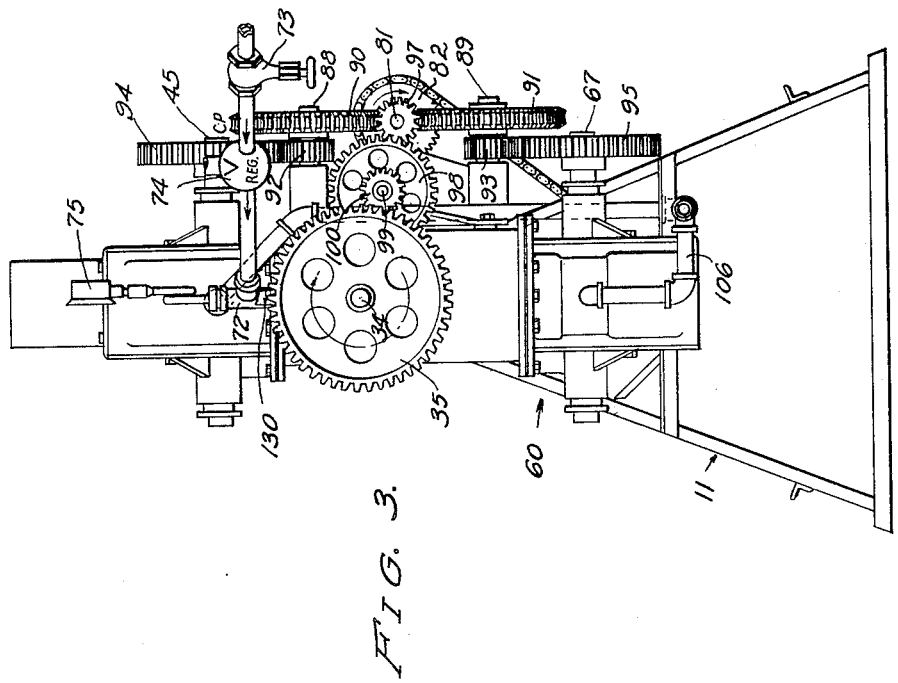
Fig. 3 is an opposite end elevational view taken in the direction of the arrow 3 in Fig. 1.
Figure 2:
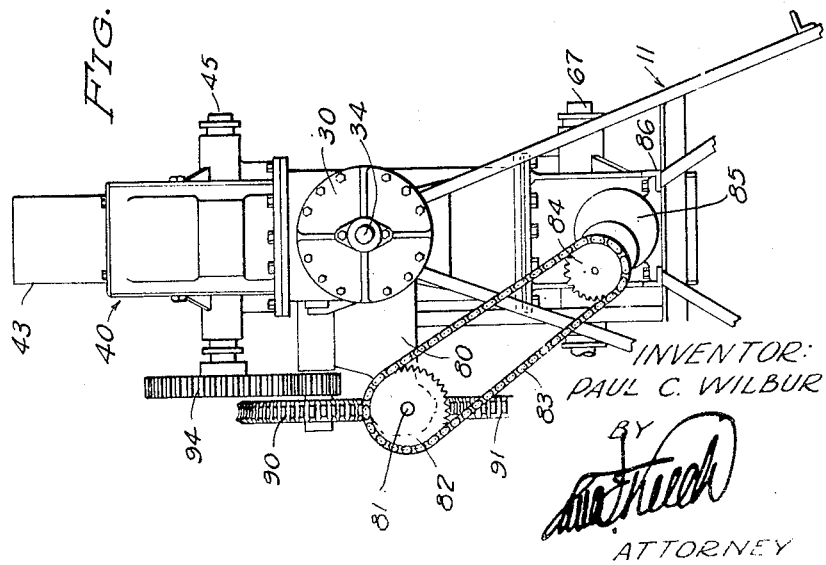
Fig. 2 is an end elevational view taken in the direction of the arrow 2 in Fig. 1.

Stub shafts 88 and 89 (Fig. 3) are also provided on the tubular body 25, these shafts rotatably supporting worm gears 90 and 91 respectively which have pinion gears 92 and 93 formed integral therewith. Fixed on the valve shafts 45 and 67 are gear wheels 94 and 95 respectively which mesh with the pinion gears 92 and 93.

The shaft 81 has worms 96 which mesh with the worm gears 90 and 91 whereby rotation of the shaft 81 by the motor 85 causes rotation of the valve rotors 46 and 66 in the direction of the arrows superimposed on these rotors in Fig. 1. Fixed on the opposite end of the shaft 81 from the gear 82 is a pinion gear 97 which meshes with a counter-gear 98, the latter being rotatably mounted on a stub shaft 99 provided on the apparatus body 25. Formed integral with the counter-gear 98 is a pinion gear 100 which meshes with the large gear 35 on the screw conveyor shaft 34 so that this shaft is driven in the direction of the arrow superimposed thereon in Fig. 3 by rotation of the shaft 81 in the direction indicated in the same figure.

Tapped into the cylindrical valve bodies 41 and 62, as shown in Fig. 1, are exhaust pipes 105 and 106 which join in a common exhaust pipe 107, the latter leading to any suitable place of discharge outside the operating room. If it is desired to conserve and make use of the heat in the exhaust steam, this pipe may lead the exhaust steam to a heat exchanger for effecting such a conservation. It is to be noted that the exhaust pipe 105 communicates with which ever one of the valve pockets 50 is disposed opposite this pipe. In the similar manner, th exhaust pipe 106 connects with whichever one of the rotor pockets 110 of the rotor 66 is disposed opposite said pipe.

The tubular body 25 is provided with perforations 120 in a small area in the bottom of this tube just in advance of the vegetable discharge opening 61 therein. Welded to the body 25 so as to enclose the area of the openings 120 is a sand trap 121, the bottom end of which is closed by a plug 122 which may be removed for cleaning this. The purpose of the openings 120 and the sand trap 121 is to catch any grit which may not have been removed from the vegetables before these were fed to the apparatus 10 and prevent this grit from getting into and causing wear in the valve 60.

Also provided on the tubular body 25 is a pressure relief valve 130 for releasing air from steam chamber 32 when commencing operations.

Operation

The apparatus 10 shown in the drawings is adapted for performing the vegetable steaming step of my novel method, and for this to operate commercially, a suitable means such as an elevator operating in timed relation with the apparatus 10 is placed so as to deliver vegetables to the hopper 43 at just that rate which the apparatus 10 is able to handle. Means must also be provided to remove vegetables discharged downwardly from the valve 60 at a rate fast enough so that these will not accumulate. Apparatus must also be provided for physically removing the skins which have been loosened from the vegetables during their passage through the apparatus 10, after these vegetables have left this apparatus. As previously noted, this final step of removing the skins may be done by rubbing or brushing these off or by washing them off as by pressure jets or sprays of water.

The method and apparatus of my invention have been successfully used in peeling many different varieties of vegetables, fruits and the like. It has already demonstrated its ability to fully perform its stated objects in peeling potatoes, carrots, beets and apples. As previously indicated, the method of my invention is a continuous method in contradistinction to the batch methods of the prior art.

Before the feeding of vegetables to the apparatus 10 commences, the variable speed motor 85 is energized to start the apparatus running at a low or medium speed. The pressure release valve 130 is now opened and the valve 73 turned on to admit steam to the steam chamber 32. After steam is issuing freely from the release valve 130, the latter is closed. Steam is supplied to the steam pipe 72 through the steam pressure control valve 74 which regulates the pressure of this steam so as to maintain any given selected pressure throughout the steam chamber 32 when the valve 73 is wide open and regardless of the boiler pressure which, of course, must always be above the pressure selected.

The control of the variable speed motor 85 is now set so as to give the vegetables in the steam chamber 32 the desired period of treatment which is equal to the period required for the travel of vegetables through the steam chamber. The apparatus is then allowed to run for about five minutes in order to heat it up and give time to remove the condensate formed while bringing the steam pressure up to the desired value. Before vegetables are delivered to the apparatus 10, they are of course washed so as to remove as nearly as possible all the dirt and grit adhering to the vegetables.

As the vegetables are fed into the hopper 43, they drop downwardly into the pockets 50 and the rate of feed is such that none of these pockets are overfilled. There is thus no cutting of the vegetables as the pockets rotate out of registry with the valve body opening 42. As each pocket 50 moves into registry with the valve body opening 44, the vegetables in that pocket gravitate into the steam chamber 32 and are immediately picked up by the screw conveyor 36 and conveyed along the steam chamber 32 towards the discharge opening 61. Reaching this opening, the vegetables drop through this and through the chute 64 and opening 63 into the discharge valve 60. The manner in which the vegetables pass through this valve is the same as that in which they passed through the feed valve 40.

As each of the pockets 50 moves downward so as to be opposite the valve body opening 44, steam from the chamber 32 fills this pocket. When the pocket then moves out of registry with the opening 44, it contains steam substantially at the pressure being maintained in the steam chamber 32. As soon as this pocket 50 comes opposite the exhaust pipe 105 however, this steam is released and conveyed away by this pipe. If the main exhaust pipe 107 is connected to a condenser in which the steam is condensed, as by a spray of cold water, a vacuum is produced which operates to completely exhaust the steam from each of the pockets 50 while it is opposite the exhaust pipe 105.

Each of the pockets 110 of the discharge valve 60, in addition to carrying vegetables, is charged with steam at the pressure prevailing in the chamber 32 when this pocket moves out of registry with the valve body opening 63. The steam in this pocket 110 is exhausted through the pipe 106 in the same manner as just described for the exhausting of steam from the pockets 50 of the valve 40.

I have discovered that the higher the pressure of the steam, the better the results obtained in loosening the skins of vegetables by my method. There are some mechanical limitations in the apparatus 10 to the pressures which can be used, but I have been able to operate this commercially with a steam pressure of 60 lbs. per sq. inch in the steam chamber 32. The time required for peeling with steam at this pressure varies considerably, but excellent results have been obtained with different vegetables and fruits, in different conditions of maturity and susceptibility to heat, in time periods varying from 5 to 30 seconds. This period is the time which the product is in the steam chamber 32.

While optimum results have been secured using a steam pressure of approximately 60 lbs. per sq. inch in the performance of my method, I have had very good results while performing this method at various other pressures over a range of from 30 to 100 lbs. per sq. inch. One of the vegetables on which my method is very advantageously used is potatoes, and the average period for very successful treatment of potatoes with my method with a steam pressure of 60 lbs., is 15 seconds.

I also find that the screw conveyor 36 tumbles the vegetables while they are traveling through the steam chamber 32 so that all portions of the vegetables are uniformly treated by the steam. The instant disclosed feed screw conveyor has a pitch-diameter ratio of approximately one to one which has been found admirably suitable for this purpose.

In order to ascertain the proper time period to be used with a given steam pressure and a given vegetable, the vegetables should be inspected as they are discharged from the valve 60 and the variable speed motor 85 speeded up or slowed down, depending upon whether a shorter or longer time period is indicated as necessary by the condition of the vegetables leaving the apparatus 10.

Obviously there are many different degrees of looseness of the peeling which may be effected by varying the length of the treatment. An immense advantage of my process over the batch peel loosening methods preceding it, is that my treatment may be exactly limited to the precise period requisite for effecting the particular degree of peel looseness which is desired. As above stated the length of this period is determined by observing the condition of the vegetables as they leave the apparatus and speeding up or slowing down the apparatus depending upon whether the treatment period needs to be shortened or lengthened.

I claim:

1. The method of steaming fresh whole vegetables to loosen their skins to facilitate peeling thereof, comprising the steps of maintaining a confined body of steam at constant pressure within a closed chamber substantially sealed from the atmosphere, constantly introducing said vegetables into said chamber by a series of successive increments, continuously advancing said vegetables through said chamber in a series of relatively shallow groupings thereof while constantly tumbling said vegetables relative to each other to subject all portions of the outer surfaces of all the vegetables in said chamber to uniform treatment by said steam, continuously discharging the steam treated vegetables from said chamber by a series of successive decrements as said vegetables conclude their passage through said chamber, and controlling the speed at which said vegetables are advanced through said chamber whereby the exposure of said vegetables to said steam in said chamber produces only that minimum degree of cooking of the outer layer of said vegetables which is necessary to facilitate the ready removal of the skin therefrom.

2. The method of steaming fresh whole vegetables, comprising the steps of maintaining a confined body of steam at constant pressure within a closed chamber substantially sealed from the atmosphere, constantly introducing said vegetables into said chamber by a series of successive increments continuously advancing said vegetables through said chamber in a series of relatively shallow groupings thereof while constantly tumbling said vegetables relative to each other to subject all portions of the outer surfaces of all the vegetables in said chamber to uniform treatment by said steam, continuously discharging the steam treated vegetables from said chamber by a series of successive decrements as said vegetables conclude their passage through said chamber, and controlling the speed at which said vegetables are advanced through said chamber to cause said treatment to uniformly cook to a precisely predetermined degree all portions of the outermost layers of all the vegetables subjected thereto.

3. An apparatus for steam treating fresh vegetables to facilitate the peeling thereof which comprises a cylindrical tube closed at its ends to form a steam-tight cylindrical steam treating chamber, a rotary steam-tight feed valve associated with one end of said tube and having a plurality of peripheral pockets for introducing successive increments of vegetables into said chamber, a steeply pitched feed screw rotatably mounted within said chamber and closely conforming to the latter, the pitch-diameter ratio of said screw being approximately one to one, said screw receiving vegetables fed into said chamber and continuously tumbling said vegetables while advancing them through said chamber, a rotary steam-tight discharge valve mounted on said tube and having a plurality of peripheral pockets communicating from beneath with the opposite end of said chamber to receive the vegetables by gravity from said screw and discharge them from the chamber, means for introducing steam into said chamber to maintain said steam at a given superatmospheric pressure in spite of a loss of steam from said chamber through said valve, flexibly controllable power drive means for co-ordinately rotating said valves and said feed screw whereby the rate at which said vegetables are conveyed through said chamber may be varied at will, and conduit means communicating with the pockets of said rotary feed and discharge valves respectively after registry of the pockets with said steam treating chamber for exhausting steam from said pockets prior to their communication with the atmosphere.

PAUL C. WILBUR.

REFERENCES CITED

The following references are of record in the file of this patent:

UNITED STATES PATENTS

| Number | Name | Date |
|---|---|---|
| 351,580 | Cook | Oct. 26, 1886 |
| 430,652 | Jarrett | June 24, 1890 |
| 523,195 | Brown | July 17, 1894 |
| 847,676 | MacKethan | Mar. 19, 1907 |
| 848,484 | Newnham | Mar. 26, 1907 |
| 887,628 | Hall | May 12, 1908 |
| 1,156,609 | Newborne | Oct. 12, 1915 |
| 1,243,724 | Fenn | Oct. 23, 1917 |
| 1,325,847 | Horst | Dec. 23, 1919 |
| 1,753,902 | Nevills | Apr. 8, 1930 |
| 1,795,302 | Forrest | Mar. 10, 1931 |
| 1,985,235 | Bizzell | Dec. 25, 1934 |
| 1,992,398 | Ryder | Feb. 26, 1935 |
| 2,083,293 | Champlin | June 8, 1937 |
| 2,260,286 | Allan | Oct. 28, 1941 |
| 2,249,785 | Winters | Oct. 28, 1947 |

FOREIGN PATENTS

| Number | Country | Date |
|---|---|---|
| 188,686 | Great Britain | May 17, 1921 |